United States Patent
Angelo et al.

(10) Patent No.: US 6,370,649 B1
(45) Date of Patent: Apr. 9, 2002

(54) COMPUTER ACCESS VIA A SINGLE-USE PASSWORD

(75) Inventors: Michael F. Angelo, Houston; David F. Heinrich, Tomball; Hung Q. Le, Katy; Richard O. Waldorf, Cypress, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/033,192

(22) Filed: Mar. 2, 1998

(51) Int. Cl.[7] ............................................... H04K 1/00
(52) U.S. Cl. ................... 713/202; 713/100; 713/200; 713/182; 713/183; 713/184; 380/249; 380/44; 235/382; 235/382.5
(58) Field of Search .................. 713/183, 184, 713/182, 1, 100, 200; 380/249, 247; 235/382, 382.5

(56) References Cited

U.S. PATENT DOCUMENTS

| | | | | |
|---|---|---|---|---|
| 4,599,489 A | * | 7/1986 | Cargile ........................... 705/52 |
| 4,800,590 A | * | 1/1989 | Vaughan ...................... 713/184 |
| 5,060,263 A | * | 10/1991 | Bosen et al. ................. 713/184 |
| 5,091,939 A | * | 2/1992 | Cole et al. ................... 713/183 |
| 5,222,135 A | * | 6/1993 | Hardy et al. ................. 713/183 |
| 5,361,062 A | * | 11/1994 | Weiss et al. ............ 340/825.33 |
| 5,375,243 A | * | 12/1994 | Parzych et al. ............. 713/202 |
| 5,802,176 A | * | 9/1998 | Audebert ..................... 713/184 |

* cited by examiner

Primary Examiner—Albert DeCady
Assistant Examiner—Paul E. Callahan
(74) Attorney, Agent, or Firm—Akin, Gump, Strauss, Hauer & Feld, LLP

(57) ABSTRACT

A computer system according to the present invention implements a self-modifying "fail-safe" password system that allows a manufacturer or site administrator to securely supply a single-use password to users who lose a power-up password. The fail-safe password system utilizes at least one fail-safe counter, an encryption/decryption algorithm, a public key, and a secure non-volatile memory space. The fail-safe password is derived by generating a hash code using SHA, MD5, or a similar algorithm and encrypting the result. The fail-safe password is then communicated to the user. After the user enters the fail-safe password, the computer system generates an internal hash value and compares it with the hash code of the decrypted fail-safe password. When the decrypted fail-safe password matches the internal hash value, the user is allowed access to the computer system.

23 Claims, 6 Drawing Sheets

COMPUTER ACCESS VIA A SINGLE-USE PASSWORD

BACKGROUND OF THE INVENTION

1. Field of the Invention

The invention relates to security in a computer system, and more particularly to a self-modifying, single-use password that limits access to the system and automatically changes each time it is used.

2. Description of the Related Art

A known method of securing information has been to encrypt the information. A known way to authenticate information has been to generate a hash code of the information by using a hash algorithm and signing the result with a key. In a typical application, the secure hash algorithm is publicly available and the encryption key is private. The decryption key may be private or public depending on the application. A hash code may be generated using a secure hash algorithm (SHA), a message digest algorithm (e.g., MD5) or a similar algorithm. SHA takes a message of varying length and produces a fixed length message digest. Message digest algorithms are meant for digital signature applications where a large message is to be compressed in a secure manner before being signed with a private key. The MD5 algorithm takes a message of arbitrary length and produces a 128 bit message digest. SHA is slightly slower than MD5, but the larger message digest makes it more secure from brute force, collision, and inversion attacks. SHA and MD5 are well known to those of ordinary skill in the art.

A known method of offering limited access to a computer system has been through the use of passwords. Passwords have typically been stored in battery-backed CMOS RAM. Before users were allowed to access the computer system, they were required to enter a password. When a password was entered, the computers power-up routine compared the entered password to the password stored in CMOS RAM and if the two matched, the user was allowed access to the computer system.

Providing sufficient security for portable computers has been even more difficult than protecting desktop computers. Due to their size, portable computers are more easily stolen than their desktop counterparts. If a computer system is stolen, the security afforded by passwords stored in battery-backed CMOS RAM may be bypassed. Like a user who forgets or misplaces the system password, a thief could open the box and remove the CMOS RAM battery in order to gain access to the system. When the CMOS RAM battery was removed, the area where the password was stored was cleared. When the CMOS RAM battery was reinstalled, the system powered-up without a password, allowing a user to access the computer system.

An alternative to storing a password in CMOS RAM is to store the password in a non-volatile memory. If the computer system password is stored in non-volatile memory, the password cannot be defeated by removing the CMOS RAM battery. An issue with this approach arises when legitimate users lose their password and cannot access the computer system. When the computer system password is stored in non-volatile memory, another method is required to allow legitimate users access to the computer system if they have forgotten or lost their password.

SUMMARY OF THE PRESENT INVENTION

Briefly, a computer system according to the present invention implements a self-modifying "fail-safe" password system that allows a manufacturer to securely supply a single-use password to users who lose or misplace a system password. The fail-safe password system utilizes a fail-safe counter, an encryption/decryption algorithm, a manufacturer's public key, and a secure non-volatile memory space. The manufacturer's public key may be specific to a computer system, customer, or site. The fail-safe counter is stored in the secure non-volatile memory space which is large enough to cover a reasonable amount of usage. The fail-safe counter can be a changeable seed value which can be augmented with additional changeable criteria. The encryption/decryption algorithm and the manufacturer's public key are stored in the secure memory space of the computer system. Protecting the public key in secure memory will help prevent brute force attacks. Alternatively, the encryption/decryption algorithm can be stored in an unsecure memory space or on a mass storage device. Preferably, the encryption/decryption algorithm is executed within secure memory.

In another embodiment of the invention, an administrator's private key is also utilized. The administrator's public key (local on the machine) allows a site administrator to provide access to a local user who has lost or forgotten their password. The administrator's public key is different than the manufacturer's public key and also resides within a secure memory space of the individual computer system.

In any of the embodiments, each time a fail-safe password is entered into the computer system, an application decrypts the fail-safe password and compares the resulting value (which is a hash code) to an internal hash value and increments the fail-safe counter or modifies the seed value when the hashes match. When the fail-safe counter is incremented, the previous fail-safe password is no longer valid. In one embodiment, the fail-safe password is decrypted with the manufacturer's public key and compared to the internal hash value that is generated by the computer system. In another embodiment, the fail-safe password is first decrypted with the administrator's public key and compared to the internal hash value. If there is no match, the application then decrypts the fail-safe password with the manufacturer's public key and compares the result to the internal hash value.

The technique is initiated when users, who have lost their password, contact the manufacturer's representative with the serial number of their computer system. In another embodiment, a site administrator is contacted before the manufacturer is contacted. In the preferred embodiment both a manufacturer fail-safe password and an administrator fail-safe password would be implemented. If for some reason the site administrator cannot supply the administrator fail-safe password, the manufacturer's representative can be contacted.

After the users' identity is validated, the administrator or manufacturer's representative executes a program that generates the next administrator or manufacturer fail-safe password for the computer system. The manufacturer or administrator fail-safe password is derived by generating a hash code using SHA, MD5, or a similar algorithm and encrypting the result. The hash code may be generated from a date stamp, the serial number of the computer system, and the number of times the user has obtained a fail-safe password for the system or a combination of less than all of the items. It should be apparent that other information could be utilized providing that at least one of the items is transitory in nature. The hash code is then encrypted with the administrator's or manufacturer's private key, to generate the fail-safe password.

The fail-safe password is then communicated to the user. After the user enters the password, the computer system generates the internal hash value and compares it with the hash code of the decrypted manufacturer or administrator fail-safe password. When the decrypted manufacturer or administrator fail-safe password matches the internal hash value the user is allowed access to the computer system. Before the system boots, the fail-safe counter is incremented, or the seed value is changed, and the password bit is cleared, which causes the system to boot as if there is no password. If an administrator fail-safe password is implemented, a separate fail-safe counter may be used or other transitory items can be utilized to create the hash code of the administrator fail-safe password. Upon boot-up, the user is requested to enter a new power-up password. Since the fail-safe counter has been incremented, or the seed value changed, the previous fail-safe password is no longer valid.

The present invention is an improvement over the discussed prior art because it allows for a hardened password security infrastructure. When the computer system password is stored in non-volatile memory, the computer system will likely be of a lesser value to a potential thief-thus discouraging theft. An important aspect of the invention is the self-modifying capability which allows the fail-safe password to only be used once.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following applications are hereby incorporated by reference:

U.S. application Ser. No. 08/66,267, entitled "SECURELY GENERATING A COMPUTER SYSTEM PASSWORD BY UTILIZING AN EXTERNAL ENCRYPTION ALGORITHM", by MICHAEL F. ANGELO, filed on Dec. 31, 1996, which is assigned to the assignee of this invention.

COMPUTER SYSTEM OVERVIEW

Figure 1:
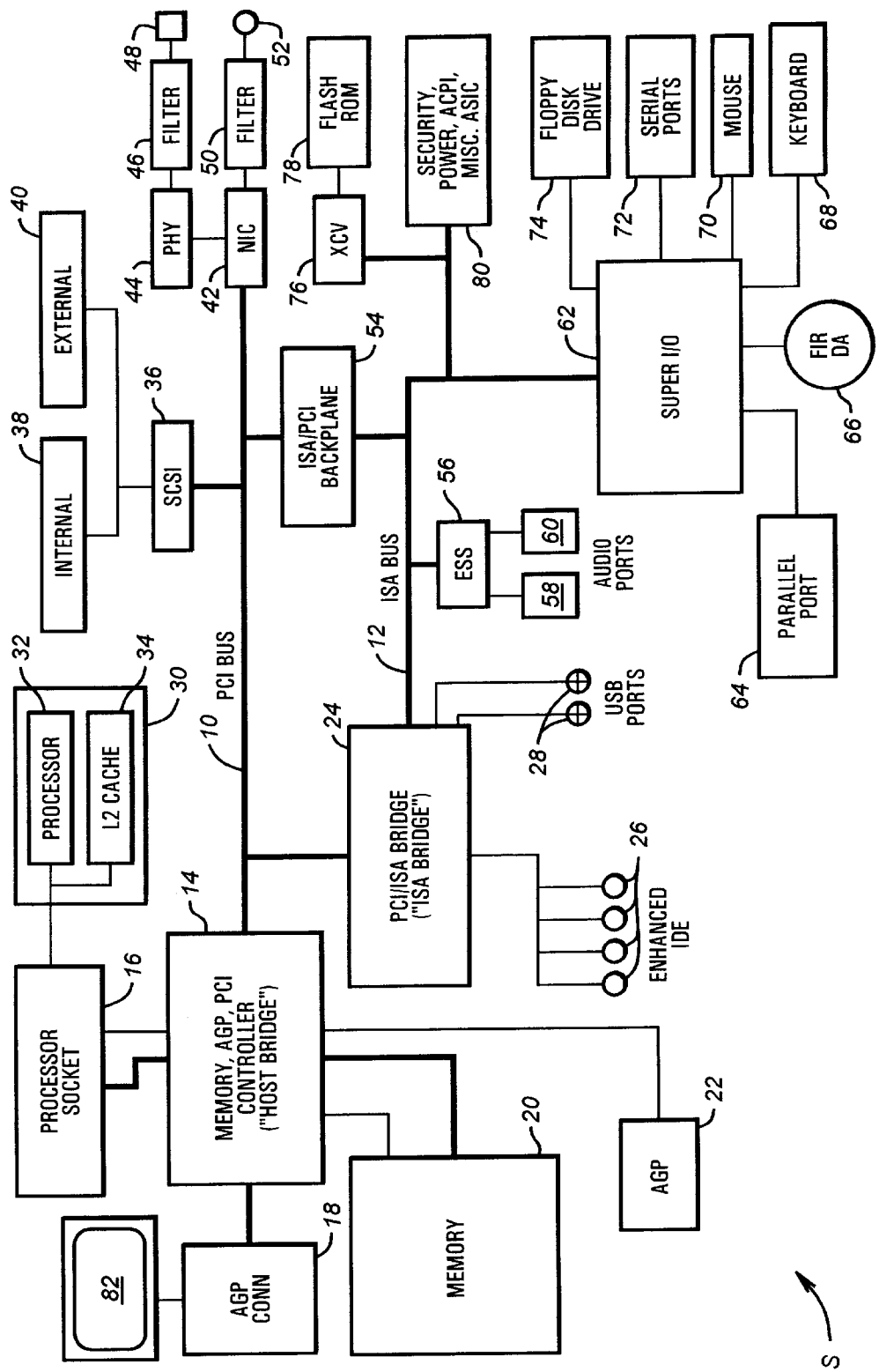
FIG. 1 is a block diagram illustrating the typical computer system S in the preferred embodiment.

Turning to FIG. 1, illustrated is a typical computer system S implemented according to the invention. While this system is illustrative of one embodiment, the techniques according to the invention can be implemented in a wide variety of systems. The computer system S in the illustrated embodiment is a PCI bus/ISA bus based machine, having a peripheral component interconnect (PCI) bus 10 and an industry standard architecture (ISA) bus 12. The PCI bus 10 is controlled by PCI controller circuitry located within a memory/accelerated graphics port (AGP)/PCI controller 14. This controller 14 (the "host bridge") couples the PCI bus 10 to a processor socket 16 via a host bus, an AGP connector 18, a memory subsystem 20, and an AGP 22. A second bridge circuit, a PCI/ISA bridge 24 (the "ISA bridge") bridges between the PCI bus 10 and the ISA bus 12.

The host bridge 14 in the disclosed embodiment is a 440LX Integrated Circuit by Intel Corporation, also known as the PCI AGP Controller (PAC). The ISA bridge 24 is a PIIX4, also by Intel Corporation. The host bridge 14 and ISA bridge 24 provide capabilities other than bridging between the processor socket 16 and the PCI bus 10, and the PCI bus 10 and the ISA bus 12. Specifically, the disclosed host bridge 14 includes interface circuitry for the AGP connector 18, the memory subsystem 20, and the AGP 22. The ISA bridge 24 further includes an internal enhanced IDE controller for controlling up to four enhanced IDE drives 26, and a universal serial bus (USB) controller for controlling USB ports 28.

The host bridge 14 is preferably coupled to the processor socket 16, which is preferably designed to receive a Pentium II processor module 30, which in turn includes a microprocessor core 32 and a level two (L2) cache 34. The processor socket 16 could be replaced with different processors other than the Pentium II without detracting from the spirit of the invention.

The host bridge 14, when the Intel 440LX Host Bridge is employed, supports extended data out (EDO) dynamic random access memory (DRAM) and synchronous DRAM (SDRAM), a 64/72-bit data path memory, a maximum memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAMs. The host bridge 14 support up to 66 megahertz DRAMs, whereas the processor socket 16 can support various integral and nonintegral multiples of that speed.

The ISA bridge 24 also includes enhanced power management. It supports a PCI bus at 30 or 33 megahertz and an ISA bus 12 at ¼ of the PCI bus frequency. PCI revision 2.1 is supported with both positive and subtractive decode. The standard personal computer input/output (I/O) functions are supported, including a direct memory access (DMA) controller, two 82C59 interrupt controllers, an 8254 timer, a real time clock (RTC) with a 256 byte complementary metal oxide semiconductor (CMOS) static RAM (SRAM), and chip selects for system read only memory (ROM), RTC, keyboard controller, an external microcontroller, and two general purpose devices. The enhanced power management within the ISA bridge 24 includes full clock control device management, suspend and resume logic, advanced configuration and power interface (ACPI), and system management bus (SMBus) control which implement the inter-integrated circuit ($I^2C$) protocol.

The PCI bus 10 couples a variety of devices that generally take advantage of a high speed data path. This includes a small computer system interface (SCSI) controller 36, with both an internal port 38 and an external port 40. In the disclosed embodiment, the SCSI controller 36 is a AIC-7860 SCSI controller. Also coupled to the PCI bus 10 is a network interface controller (NIC) 42, which preferably supports the ThunderLan™ power management specification by Texas Instruments. The NIC 42 is coupled through a physical layer 44 and a filter 46 to an RJ-45 jack 48, and through a filter 50 to a AUI jack 52.

Between the PCI Bus 10 and the ISA Bus 12, an ISA/PCI backplane 54 is provided which include a number of PCI and ISA slots. This allows ISA cards or PCI cards to be installed into the system for added functionality.

Further coupled to the ISA Bus 12 is an enhanced sound system chip (ESS) 56, which provides sound management through an audio in port 58 and an audio out port 60. The ISA bus 12 also couples the ISA bridge 24 to a Super I/O chip 62, which in the disclosed embodiment is a National Semiconductor Corporation PC87307VUL device. This Super I/O chip 62 provides a variety of input/output functionality, including a parallel port 64, an infrared port 66, a keyboard controller for a keyboard 68, a mouse port for a mouse port 70, additional series ports 72, and a floppy disk drive controller for a floppy disk drive 74. These devices are coupled through connectors to the Super I/O 62.

The ISA bus 12 is also coupled through bus transceivers 76 to a flash ROM 78, which can include both basic input/output system (BIOS) code for execution by the processor 32, as well as an additional code for execution by microcontrollers in a ROM-sharing arrangement.

The ISA bus 12 further couples the ISA bridge 24 to a security, power, ACPI, and miscellaneous application specific integrated circuit (ASIC) 80, which provides a variety of miscellaneous functions for the system. The ASIC 80 includes security features, system power control, light emitting diode (LED) control, a PCI arbiter, remote wake up logic, system fan control, hood lock control, ACPI registers and support, system temperature control, and various glue logic. The security features provided by ASIC 80, among other things, control allocation of secure memory space.

Finally, a video display 82 can be coupled to the AGP connector 18 for display of data by the computer system S.

Again, a wide variety of systems could be used instead of the disclosed system S without detracting from the spirit of the invention.

Figure 2A:
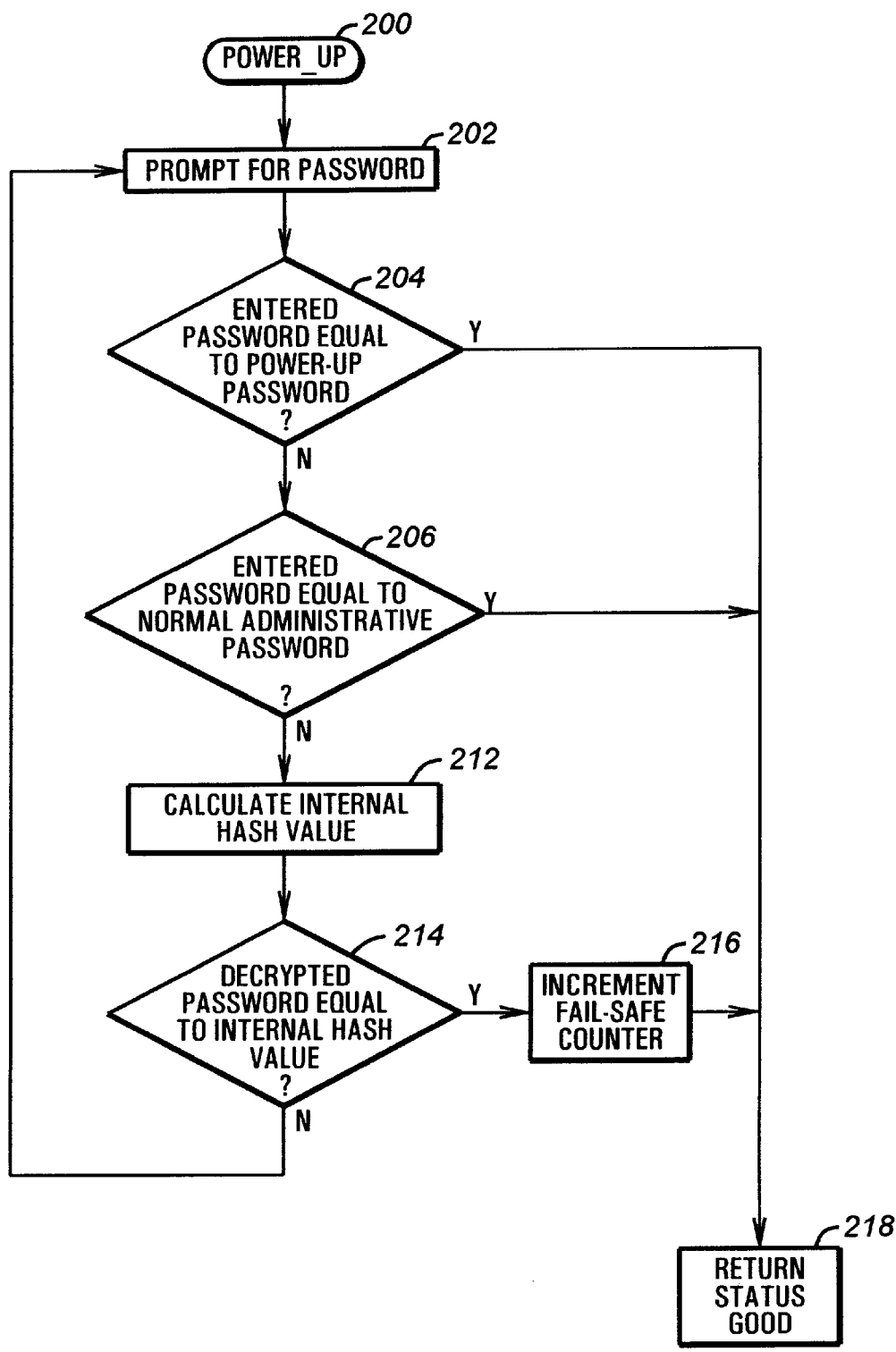
FIG. 2A is a flowchart diagram illustrating a procedure according to the present invention for verifying a password upon power-up of the computer system S.

Referring now to FIG. 2A, a Power-up routine 200 according to one embodiment of the present invention is illustrated. This routine is preferably executed out of secure or write protected memory during system startup. At step 202 the computer system S prompts the user to enter a password. After the user enters a password, control is transferred to step 204. In step 204 the computer system S checks if the entered password is equal to a previously stored power-up password. The power-up password can be stored in secure memory. If the entered password equals the power-up password the routine transfers to step 218 where it returns status good upon exiting the routine. If the entered password is not equal to the power-up password the routine transfers to step 206.

In step 206 the computer system S checks to see if the entered password is equal to the previously stored normal administrative password. The normal administrative password, too, can be stored in secure memory. If the entered password equals the normal administrative password the routine transfers to step 218 where it returns status good upon exiting the routine. If the entered password is not equal to the normal administrative password the routine transfers to step 212.

At this point, it is helpful to discuss the fail-safe counter 242, further discussed below in conjunction with FIG. 4. The fail-safe counter 242 is preferably contained in a secure area and forms a part of the secure self-modifying, single-use password aspect of the disclosed system. Generally, the fail-safe counter 242 is provided as a seed for an algorithm that establishes a password. A manufacturer has a mirror of such a fail-safe counter 242. When such comparison positively occurs, the manufacturer increments its mirror fail-safe counter, perhaps stored on a customer service database. The computer system S according to the invention also increments the fail-safe counter 242. When using an administrative fail-safe password, a different fail-safe counter may be utilized to track the usage of the administrator fail-safe password or other transitory items may be utilized. For example, the administrator fail-safe password could be based solely on the date and the manufacturer's serial number of the computer system S. Preferably, a separate counter would be utilized. Then, the next time the user cannot access the system because of a lack of knowledge of what the password is, a new internal hash value is generated within the computer based on the fail-safe counter 242, and a new, fail-safe password is generated by the manufacturer based the manufacturer's mirror fail-safe counter. Preferably, the fail-safe counter simply rolls over to zero after reaching its maximum count, both within the computer system S and at the manufacturer.

In step 212 an internal hash value is generated and control is passed to step 214. This can be done in a variety of ways. The computer system S generated internal hash value can be based upon a system manufacturer's serial number, the present date, the value of the fail-safe counter 242, and perhaps augmented with a changeable seed value. Granularity in the date stamp is desirable to allow the user some latitude in entering the fail-safe password into the computer system S. For example, the fail-safe password could be valid for a day, week, etc. Further, a variety of algorithms can be used to generate the internal hash value, which are all known to those skilled in the art. For example, refer to previously incorporated application entitled "SECURELY GENERATING A COMPUTER SYSTEM PASSWORD BY UTILIZING AN EXTERNAL ENCRYPTION ALGORITHM", for further details of various encryption algorithms for passwords.

In step 214, the entered password is processed and compared to the internal hash value. At this point it should be apparent that for a match to occur, the entered password must be a valid fail-safe password. It will be appreciated that the manufacturer or administrator fail-safe password must have been obtained from the manufacturer or site administrator, who has a mirror of the appropriate fail-safe counter and knows the inner workings of the password generation algorithm of the computer system S.

In the preferred embodiment, both an administrator fail-safe counter and a manufacturer fail-safe counter 242 are implemented. In this embodiment, the administrator mirrors the administrator fail-safe counter. If the internal hash value is not equal to the decrypted manufacturer or administrator fail-safe password, control is returned to step 202. In an effort to dissuade brute force, collision, and inversion attacks, an application may disable the computer and require a power cycle after a certain number of attempts to access the computer system S have failed. If the internal hash code is equal to the decrypted manufacturer or administrator fail-safe password, control is passed to step 216. In step 216, the appropriate fail-safe counter is incremented and control is then passed to step 218. The appropriate fail-safe counter is incremented so that the same manufacturer or administrator fail-safe password will no longer activate the system. This is the single-use nature of the password. Step 218 returns status good upon exiting the routine and the user is allowed to access the computer system S.

Figure 2B:
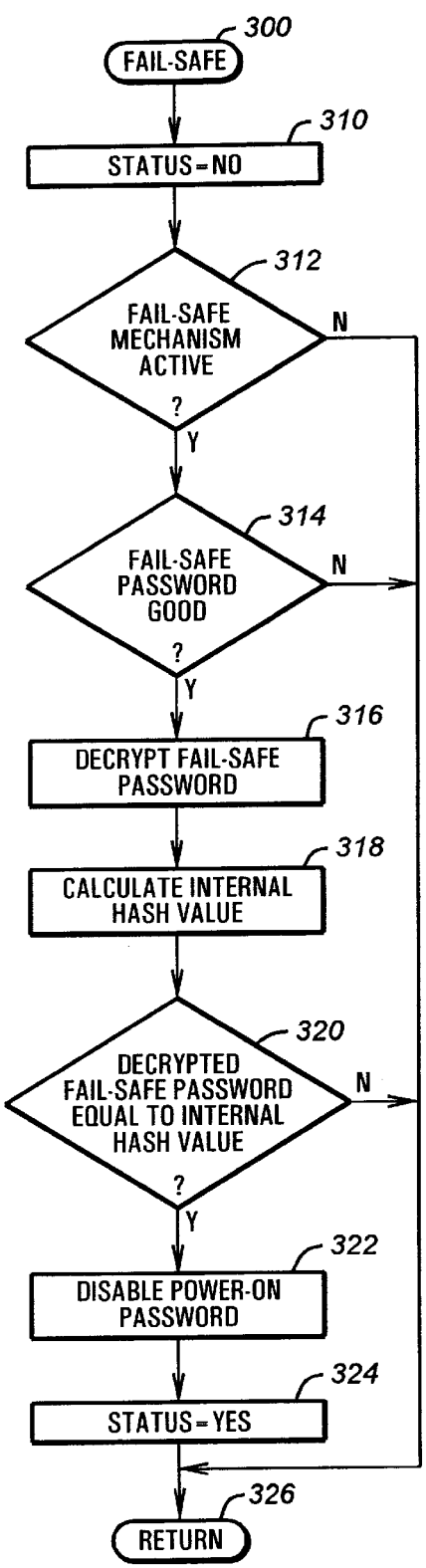
FIG. 2B is a flowchart diagram illustrating a procedure according to the present invention for creating a fail-safe password and verifying the manufacturer or administrator fail-safe password upon power-up of the computer system S.

Turning to FIG. 2B, the flow diagram of a fail-safe routine 300 is illustrated. The routine is called when the entered password is not equal to power-up password or the normal administrative password. This is indicated by the status being set to 'no' in step 310. This step corresponds to the status being set to 'no' in step 206 of FIG. 2A. Control is then transferred to step 312 where it is determined whether the fail-safe mechanism is active. If the fail-safe mechanism is not active control transfers to step 326 where a 'no' is returned to the calling routine. If the fail-safe mechanism is active then control is transferred to step 314 where it is determined whether the manufacturer or administrator fail-safe password is good, by performing a checksum on the manufacturer or administrator fail-safe password. As before, the fail-safe password may be supplied by the manufacturer or a site administrator. If the manufacturer or administrator fail-safe password has a valid checksum, control is transferred to step 316. In step 316 the manufacturer or administrator fail-safe password is decrypted with the public key that corresponds to the manufacturer or administrator's private key. The decryption yields the hash code generated from the manufacturer or administrator's fail-safe counter and other (optional) information. In step 318, the internal hash value is generated. In step 320, the internal hash value is compared to the decrypted manufacturer or administrator fail-safe password. If the hashes are not equivalent, control passes to step 326 where a 'no' is returned to the calling routine. If the hashes are equivalent, control is passed to step 322 where the power-up password is cleared. Control then passes to step 324 where the status is set to 'yes'. Control then passes to step 326 where the 'yes' is returned to the calling routine and the user is allowed access to the computer system S.

Figure 3:
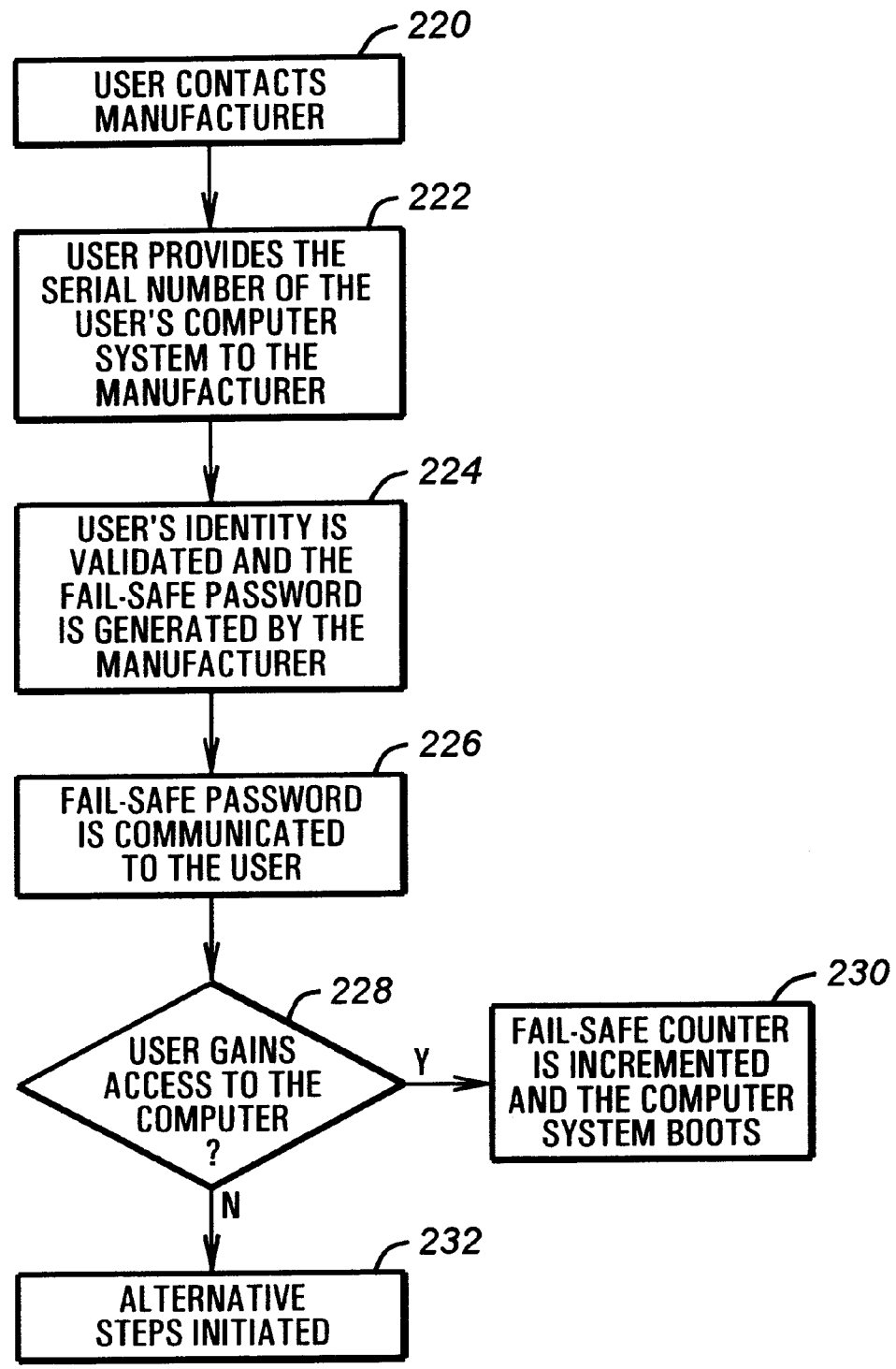
FIG. 3 is a flow diagram of one aspect of the invention illustrating the steps a user would complete in obtaining a fail-safe password from a manufacturer or site administrator.

Turning to FIG. 3, a flow diagram of one embodiment of the technique, which is implemented when a user has lost their password, is illustrated. In step 220, the user contacts the manufacturer's representative to obtain a manufacturer fail-safe password. The user might call the manufacturer on the telephone or contact the manufacturer by using a different computer (e-mail, etc.). In step 222, the user provides the manufacturer with the serial number of their computer system S.

Proceeding to step 224, the user's identity is first validated. It will be appreciated, for example, that in one theft prevention technique, the user reports a stolen computer and requests the manufacturer to invalidate the corresponding serial number. That serial number can then be "tagged" in the manufacturer's database as being a stolen computer. If a surreptitious user then 25 calls in and provides the serial number of the stolen computer, the manufacturer can refuse to provide an appropriate password and can take other appropriate action, such as contacting authorities and informing the real owner of the computer system S. Alternatively, the manufacturer might request that the computer be brought to a service center for servicing followed by confiscation of the computer.

In step 224, after the user's identity is validated, the representative runs a program that generates the next fail-safe password for that computer system S. As previously described, the fail-safe password is generated from a mirror of the fail-safe counter and any seed value specific to an individual computer system S. The manufacturer maintains the mirror counter and seed value for each computer system S. As stated previously, a portion of the seed value could be the value of the fail-safe counter, which would be incremented each time a fail-safe password is provided to the user. Alternatively, or additionally, a portion of the seed value could represent any variable providing that the manufacturer can simultaneously mirror changes in the seed value in the specific computer system S.

In step 226, the fail-safe password is then communicated to the user. After the user enters the password, the computer system S calculates the internal hash value and compares it with the decrypted manufacturer fail-safe password. Preferably, this is done in a secure portion of memory or in a secure operating mode. In step 228, it is determined if the decrypted manufacturer fail-safe password matches the internal hash value. If so, the user is allowed access to the computer system S and control passes to step 230. In step 230, since the fail-safe password has allowed the user access to the computer system S, the fail-safe counter 242 of FIG. 4 within the computer system S is incremented (or the seed value changed). Again, since the incrementing of the fail-safe counter prevents the reuse of the fail-safe password, the incrementing of the fail-safe counter is preferably accomplished within a secure mode that cannot be interrupted by the user. Even if an illegitimate user determines the particular hash algorithm used, the values that are hashed, and the public key, the next encrypted fail-safe password cannot be determined, unless the private key is discovered. When the fail-safe counter 242 of FIG. 4 is incremented, the previous fail-safe password is no longer valid. Following the modification of the fail-safe counter 242 of FIG. 4, the computer system S boots as if there is no password, allowing the user to enter a new power-up password. In step 232, if the fail-safe password did not allow the user access to the computer system S, alternative steps may be required. The alternative steps could include returning the computer system S to the manufacturer or involve on-site servicing by the manufacturer.

Figure 4:
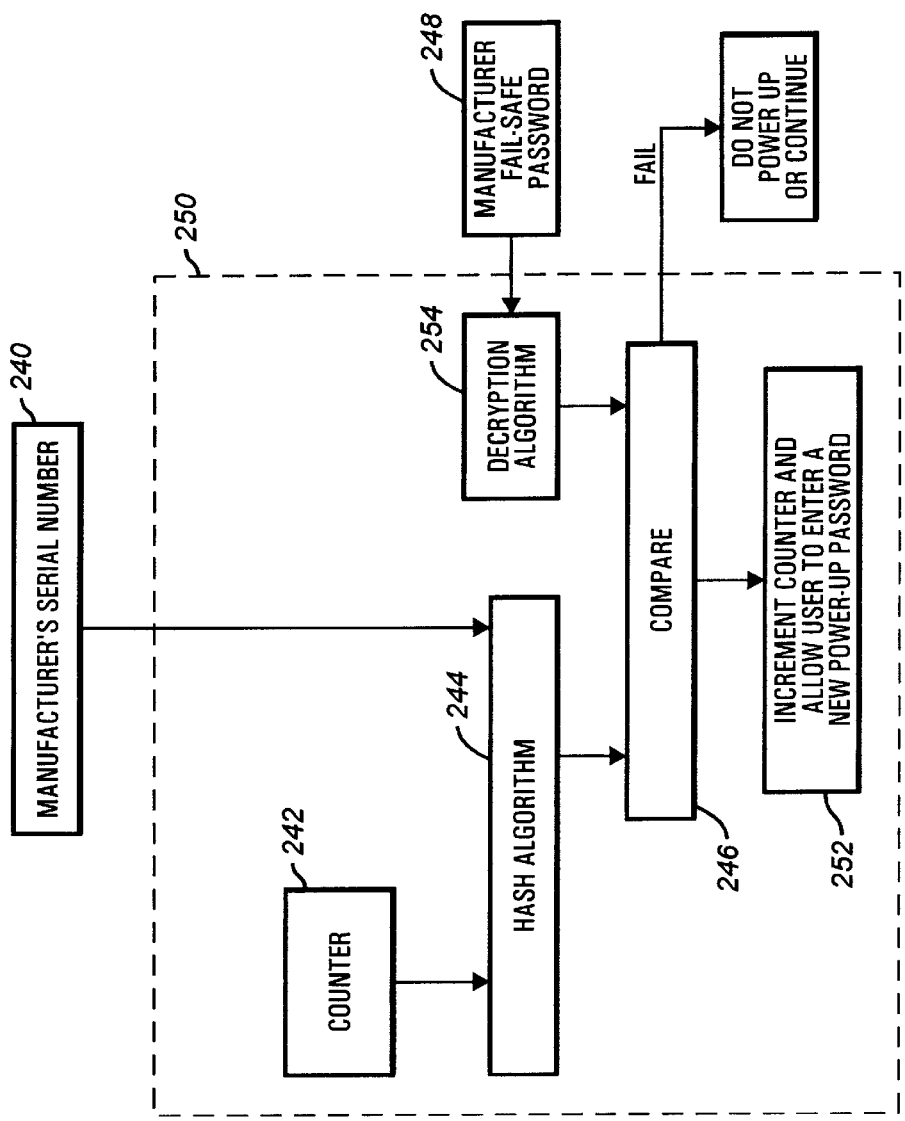
FIG. 4 is a simplified block diagram of one implementation of the present invention within secure memory.

FIG. 4 illustrates a simplified block diagram of one embodiment of the invention as it is performed within a secure mode of operation 250. FIG. 4 is conceptual in nature and the secure mode of operation 250 could include hardware, such as the fail-safe counter 242, and a secure mode of operation, such as system management mode. In any case, the information contained within the secure mode of operation 250 is preferably not readily accessible to a user. A hash algorithm 244 generates an internal hash value using the count of the fail-safe counter 242 and the manufacturer's serial number 240. This operation could be executed in a secure power-up mode. The hash algorithm 244 is preferably maintained in secure memory space.

The result of the hash algorithm 244 is the internal hash value. A decryption algorithm 254 decrypts the manufacturer fail-safe password 248. The decrypted manufacturer fail-safe password is then compared (block 246) with the internal hash value. As discussed above, the manufacturer fail-safe password 248 is provided by a manufacturer, who has mirrored the workings of the secure mode of operation 250. If both site administrator and manufacture fail-safe passwords are desired, a separate fail-safe counter would preferably be maintained for each. The site administrator would utilize an administrator's private key to generate the fail-safe password for the computer system S. When the internally generated hash value is equal to the decrypted manufacturer or administrator fail-safe password, the user is allowed access to the computer system S and the appropriate fail-safe counter is incremented (block 252), thereby invalidating the previous fail-safe password. Again, incrementing the fail-safe counter 242 within the secure mode of operation 250 will prevent a potential thief from reusing a derived password. Once the fail-safe counter 242 is incremented, the user is allowed to enter a new power-up password (block 252).

Figure 5:
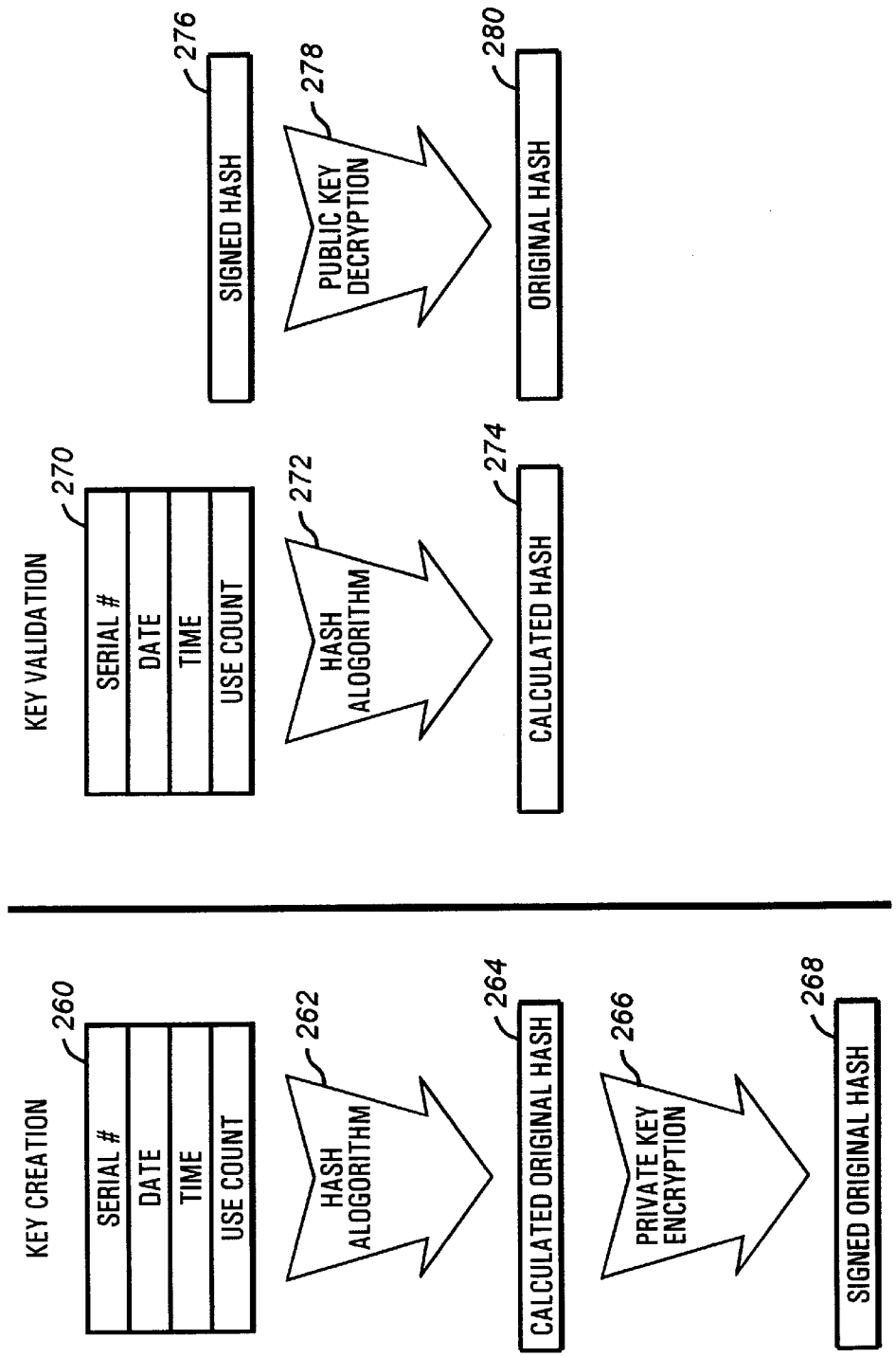
FIG. 5 is a diagram depicting the creation of a manufacturer or administrator fail-safe password, the creation of the internal hash value, and the decryption of the manufacturer or administrator fail-safe password.

Turning to FIG. 5, the creation of the fail-safe password 268 and the internal hash value 274 is illustrated. To generate the fail-safe password, information 260 is input into a hash algorithm 262, which generates a calculated original hash 264 (external hash value). The calculated original hash 264 is then encrypted with a private key 266, which yields a signed hash 268. The signed hash 268 is the manufacturer or administrator fail-safe password. The manufacturer or administrator fail-safe password is communicated to the user as described above. After the manufacturer or administrator fail-safe password is entered into the computer system S, an application performs a hash algorithm 272 on information 270 which is derived internal to the computer system S. It is readily appreciated that the hash algorithms 262 and 272 must be the same. It is also readily apparent that the information 260 and 270 used to create the hashes 264 and 274 must be the same. The signed hash 276 (manufacturer or administrator fail-safe password) is decrypted using a public key 278. The result of the public key decryption 278 is the original hash 280. Providing that the public key 278 corresponds to the private key 266, the calculated hash 274 (internal hash value) will be equal to the original hash 264 or 280.

Thus, a system has been described in which a fail-safe password is derived by first generating an external hash code using SHA, MD5, or a similar algorithm and encrypting the result using a private key. In one embodiment, the external hash code is generated from a date stamp, the serial number of the computer system S, and the number of times the user has obtained a fail-safe password for the system. The resulting hash code is then encrypted with the manufacturer's private key. The encrypted hash code is the manufacturer fail-safe password. After the manufacturer fail-safe password is entered into the computer system S the encrypted hash code is decrypted with a stored manufacturer's public key. The manufacturer's public key may be an individual key that is unique to multiple computer systems or unique to a particular computer system.

According to the invention, it will be appreciated that the basic concept of providing a password within a computer system that automatically changes to a next arbitrary password, and mirroring that password generation at a manufacturer's site, permit added security and a reduction in value of a computer should it be stolen. Once a computer is stolen and the manufacturer informed, the manufacturer can refuse to provide an appropriate next fail-safe password to a caller and can further relay information regarding that stolen computer to the appropriate authorities.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for allowing a user access to a password protected computer system through the use of a fail-safe password, the fail-safe password comprising an external hash value encrypted with an external private key, the method comprising the steps of:

securely generating an internal hash value within the computer system, wherein the internal hash value is based on a changeable seed value distinct from a previous fail-safe password;

providing the fail-safe password to the computer system;

decrypting the fail-safe password using a public key corresponding to the private key to provide the external hash value;

comparing the internal hash value to the external hash value;

changing the seed value to a next seed value when the internal hash value equals the external hash value; and permitting the user to access the computer system when the internal hash value equals the external hash value.

2. The method of claim 1, wherein the seed value is a count produced by a fail-safe counter that represents the number of times the fail-safe password has been utilized to regain access to the computer system, the fail-safe counter being incremented when the internal hash value equals the external hash value.

3. The method of claim 1, wherein the step of providing the fail-safe password to the computer system further comprises:

obtaining the fail-safe password from a manufacturer, the manufacturer maintaining a mirror seed value that corresponds to the changeable seed value.

4. The method of claim 3, wherein the step of providing the fail-safe password to the computer system further comprises:

communicating the fail-safe password to the user by the manufacturer after the user's identity is validated, the fail-safe password being entered into the computer system by the user through a locally connected keyboard.

5. The method of claim 1, wherein the step of providing the fail-safe password to the computer system further comprises:

obtaining the fail-safe password from a site administrator, the administrator maintaining a mirror seed value, the mirror seed value corresponding to the changeable seed value.

6. The method of claim 1, wherein the seed value includes a fixed portion.

7. The method of claim 6, wherein the fixed portion of the seed value includes the computer system serial number.

8. The method of claim 1, wherein the step of permitting the user to access the computer system further comprises:

allowing a new power-up password to be entered upon boot-up if the internal and external hash values are the same.

9. The method of claim 1, wherein the external and internal hash values are generated with SHA.

10. The method of claim 1, wherein the external and internal hash values are generated with MD5.

11. The method of claim 1, wherein the fail-safe password is an encrypted hash code of a mirror seed value which has been encrypted with a manufacturer's private key.

12. A computer system having security capabilities enabled by a computer system generated internal hash value, the computer system comprising:

a system bus;

a processor coupled to the system bus;

a mass storage device coupled to the system bus; and security code stored in a processor readable medium for causing the processor to perform the steps of:

securely generating the internal hash value within the computer system, wherein the internal hash value is based on a changeable seed value distinct from a previous fail-safe password;

providing a fail-safe password to the computer system;

decrypting the fail-safe password using a public key corresponding to a private key to provide an external hash value;

comparing the internal hash value to the external hash value;

changing the seed value to a next seed value when the internal hash value equals the external hash value; and permitting the user to access the computer system when the internal hash value equals the external hash value.

13. The computer system of claim 12, wherein the seed value is a count produced by a fail-safe counter that represents the number of times the fail-safe password has been utilized to regain access to the computer system, the fail-safe counter being incremented when the internal hash value equals the external hash value.

14. The computer system of claim 12, wherein the step of providing the fail-safe password to the computer system further comprises:

obtaining the fail-safe password from a manufacturer, the manufacturer maintaining a mirror seed value that corresponds to the changeable seed value.

15. The computer system of claim 14, wherein the step of providing the fail-safe password to the computer system further comprises:

communicating the fail-safe password to the user by the manufacturer after the user's identity is validated, the fail-safe password being entered into the computer system by the user through a locally connected keyboard.

16. The computer system of claim 12, wherein the step of providing the fail-safe password to the computer system further comprises:

obtaining the fail-safe password from a site administrator, the administrator maintaining a mirror seed value, the mirror seed value corresponding to the changeable seed value.

17. The computer system of claim 12, wherein the seed value includes a fixed portion.

18. The computer system of claim 17, wherein the fixed portion includes the computer system serial number.

19. The computer system of claim 12, wherein the step of permitting the user to access the computer system further comprises:

allowing a new power-up password to be entered upon boot-up if the internal and external hash values are the same.

20. The computer system of claim 12, wherein the external and internal hash values are generated with SHA.

21. The computer system of claim 12, wherein the internal and external hash values are generated with MD5.

22. The computer system of claim 12, wherein the fail-safe password is an encrypted hash code of the seed value which has been encrypted with a manufacturer's private key.

23. A method for allowing a user to access a password protected computer system through the use of a fail-safe password, comprising:

contacting a manufacturer of the computer system for the fail-safe password;

generating the fail-safe password based on a changeable mirror seed value distinct from a previous fail-safe password;

providing the fail-safe password to the user;

entering the fail-safe password into the computer system; and changing the mirror seed value when the user is successful in accessing the computer system, wherein the user's computer system has its own seed value which is internally changed to the next seed value.

* * * * *